3,445,556
METHOD OF PREPARING SHAPED ARTICLES OF CELLULOSE GRAFT COPOLYMERS

Joseph M. Kuzmak, Media, and Joseph W. Schappel, Morton, Pa., assignors to FMC Corporation, Philadelphia, Pa., a corporation of Delaware
No Drawing. Filed May 11, 1966, Ser. No. 549,167
Int. Cl. D01d 5/08; D01f 3/28
U.S. Cl. 264—195                                    6 Claims

ABSTRACT OF THE DISCLOSURE

Cellulose graft copolymers are prepared by extruding viscose containing a free-radical producing catalyst, in the form of a shaped article into a coagulating medium, then subjecting the article to graft copolymerizable conditions prior to complete regeneration of said article.

---

This invention relates to a method of preparing shaped articles of cellulose graft copolymers.

Belgian Patent 646,284 discloses a method of preparing graft copolymers from ethylenically unsaturated compounds and cellulose wherein a cellulose material, such as cotton, rayon, or flax in the form of fibers, yarns, or fabrics, is first derivatized to form a mono- or dithiocarbonate of cellulose and the product caused to react with at least one ethylenically unsaturated monomer in the presence of a free radical catalyst system.

It is an object of this invention to provide a method of preparing shaped articles of cellulose graft copolymers which is convenient and expedient.

It is another object of this invention to provide a continuous method of preparing shaped articles of cellulose graft copolymers.

It is another object of this invention to provide a method of preparing filaments of cellulose graft copolymers.

These and other objects are accomplished in accordance with this invention which comprises extruding viscose in the form of a shaped article into a coagulating medium, and subjecting said article to graft copolymerizing conditions in the presence of at least one polymerizable ethylenically unsaturated monomer and a free radical producing catalyst system prior to complete regeneration of said article. It is preferred in accordance with this invention that the shaped article is a continuous extruded filament or plurality of filaments.

The free radical producing catalyst system for this invention is conventional and described in many prior publications including the previously mentioned Belgian Patent 646,284, as well as U.S. Patent 3,083,118. In general, the free radical producing catalysts are initiators which include, for example, hydrogen peroxide, sodium peroxide, alkali metal persulfates, ammonium persulfate, alkali metal and ammonium salts of percarbonic and perboric acids; benzoyl peroxide, acetyl peroxide, lauryl peroxide, dialkyl peroxide, di-t-butyl peroxide, cyclohexyl hydroperoxide, t-butyl-hydroperoxide, cumene hydroperoxide, t-butyl-peroxyacetate, t-butyl-peroxybenzoate; peracetic, perbenzoic, peroxylactic acids; azobisisobutyronitrile, sodium periodate, and the like. The preferred polymerization initiators are water-soluble peroxidic compounds which yield free-radicals.

In addition to the above initiators, the catalyst system may include activators to form a redox type of catalyst system which produces free radicals. These systems are also well-known in the art and include, for example, peroxidic initiators with compounds incorporating reducing cations, e.g., ferrous, chromous, manganous, cuprous, titanous, silver ion, and the like.

The free-radical producing catalyst system is generally incorporated in the polymerizable monomer mix through which the incompletely regenerated viscose article is passed to produce the graft copolymer. The catalyst may, however, be injected into the viscose solution prior to extrusion or even incorporated in the coagulating bath. These latter arrangements will, of course, depend on the particular catalyst employed since certain of the useful initiators and activators may produce an undesirable result when spinning the viscose solution such as clogging the spinnerettes.

The amount of free-radical producing catalyst present during graft copolymerization will generally be from about 0.10% to 15% and preferably from about .25% to 5% based on the total weight of the graft copolymerizing medium (e.g., water, monomer, catalyst, etc.).

The ethylenically unsaturated monomers which are useful for producing cellulose graft copolymers in accordance with this invention are almost exhaustively listed in said Belgian Patent 646,284, and also in British Patent 1,020,620. Any ethylenically unsaturated monomer or combination of monomers which are capable of polymerization in the presence of a free-radical producing catalyst are useful for this invention. For example, vinyl compounds including vinyl halides, vinyl esters, vinylidene halides, vinyl pyridines, vinyl pyrrolidone, vinyl alkyl ethers, divinyl sulfone, and the like; acrylic compounds including acrylic acid, methacrylic acid, chroroacrylic acid, alkyl acrylates, alkyl methacrylates, acrylonitrile, methacrylonitrile, acrylamide, methacrylamide, and the like; aliphatic diacids including maleic acid, itaconic acid, fumaric acid and the like; substituted aromatic compounds including styrene, methyl styrene, dimethyl styrene, chlorostyrene and the like; aliphatic diene compounds including butadiene, isoprene, haloprenes and the like, unsubstituted and substituted alpha olefins including ethylene, propylene, butylene, isobutylene and the like.

The monomer or mixture of monomers are generally dissolved or dispersed in a liquid, preferably aqueous, in any desired concentration to provide a graft copolymerizing medium.

Stabilizing, dispersing, buffering, pH adjusting, and similar ingredients, as well as the free-radical catalyst may be present in the monomer mix (graft copolymerizing medium) to provide the desired conditions for polymerizing. Some of the polymerizable monomers may, under controlled conditions, be placed in the coagulating medium for the extruded viscose or even injected into the viscose prior to extrusion. However, for most purposes it is satisfactory to provide a separate bath containing the liquid monomer mix subsequent to the viscose coagulating medium. The amount of monomer present during the graft copolymerizing step is generally from 0.5% to 20% and preferably from 1% to 10% based on the total weight of the graft copolymerizing medium.

The viscose composition for this invention is not critical with respect to the cellulose, alkali and carbon disulfide used in the preparation thereof. In general, the viscose may contain from about 1.5 to about 15% cellulose, from about 4 to about 10% caustic soda and from about 25 to about 60% carbon disulfide based on the weight of the cellulose in the viscose. The viscose is prepared in the conventional manner and may be allowed to ripen before spinning with or without ripening modifiers. It may have any desired sodium chloride salt test at the time of spinning and this may vary from about 1.5 to about 12 or higher.

Preferably, the viscose contains a modifier such as that commonly employed in the manufacture of tire cord type viscose rayon. As is well-known, the modifier may be added to the viscose during its preparation as in the mixing step before ripening or it may be added to the stream of viscose just prior to extrusion into the spinning bath by the well-known injection spinning technique. A large number of modifiers are known and are in use in the producton of the various types of viscose rayon. These modifiers include polyoxyalkylene glycols such as polyoxyethylene glycols, polyoxypropylene glycols and block copolymers of propylene and ethylene oxide; various amines including monoamines, diamines and polyamines such as diethylamine, dimethylamine, ethylene diamine and diethylenetriamine; reaction products of alkylene oxides with fatty acids, fatty alcohols, fatty amines, aromatic acids, aromatic alcohols, aromatic amines, partial esters of fatty acids and polyhydric alcohols such as reaction products of ethylene oxide with lauryl alcohol, phenol, lauryl amine, glycerol monostearate, etc.; quaternary ammonium compounds and the like. The amount of modifier may vary from about 2% to about 5%, based on the weight of the cellulose.

Specific illustrations of satisfactory modifiers are polyoxyethylene glycol having a molecular weight of from about 600 to about 6000, polyoxyethylene glycol ethers of phenol or sorbitol having a molecular weight within the stated range or a combination of such modifiers with a monoamine such as dimethylamine. Where a combination of modifiers is used, the monoamine is preferably present in an amount of from 1.5% to 3.5% and the glycol or ether in an amount of from about 1% to 3.5% both proportions being based upon the weight of the cellulose in the viscose.

Conventional spinning baths to coagulate the extruded viscose may be employed herein. These baths generally contain acid salts to coagulate the viscose although other compounds will also serve this purpose. In addition, a mineral acid may be included to speed coagulation and start regeneration. Regeneration retardants such as the aldehydes, particularly formaldehyde, or equivalent, and/or glyoxal may be beneficially included in the bath. Zinc salts to improve the strength of the article may also be included.

If desired, one or more bath systems may be employed to coagulate the viscose article and regenerate to the desired degree.

A critical feature of this invention involves subjecting the coagulated viscose article to graft copolymerizing conditions prior to complete regeneration of the article. If the viscose is extruded into a spinning bath which causes substantially complete regeneration, little or no grafting will take place on subjecting the article to copolymerizing conditions. Either the spin bath itself must be non-regenerating or regeneration retardants must be present in the viscose or bath to produce the desired grafting results. In general, the xanthate sulfur content of the viscose article should be at least about 0.05% and preferably at least about 0.5% based on the cellulose content of the viscose.

It has been found beneficial, at times, to employ a water-wash bath after the coagulating step prior to the graft copolymerizing step to remove impurities. This appears to diminish the amount of homopolymer formed during the grafting. Under certain spinning conditions, it may also be desirable to run the cellulose article through a regenerating bath after the graft copolymerizing step to free the cellulose of remaining xanthate groups.

After the graft copolymerizing step, with or without a further regeneration treatment, the cellulose graft copolymer article is generally aftertreated in the usual manner, depending on the type of article, including, if desired, washing, desulfurizing, finishing, and stretching. The stretching step or steps may be carried out on wet or dry material at elevated or room temperature as well-known in the art.

As previously stated, the shaped articles of this invention are preferably continuous filaments, yarns or staple fiber, but also include films, bands, tapes, tubes, and other shaped articles capable of being formed in an extrusion process.

To demonstrate the method of this invention, the following examples are set forth.

Example I

Tire yarns were prepared as follows:
A viscose solution was made in the conventional manner having the following composition:

|  | Percent |
|---|---|
| Cellulose | 7.5 |
| Caustic soda | 6.5 |
| Carbon disulfide | [1] 38.0 |

[1] Based on the weight of the cellulose.

The viscose was aged at about 21° C. for 22 hours and had a sodium chloride salt test of 8.1 to 6.5. This viscose was modified by the addition of 2.6% of dimethyl amine and 1.3% of a polyoxyethylene glycol ether of phenol containing an average of 15 ethylene oxide units per mole of phenol, based on the weight of the cellulose.

The ripened viscose was spun into a bath kept at about 50° C. containing 6.8% sulfuric acid, 14.3% sodium sulfate and 5.9% zinc sulfate, then run through a cascade bath of the same composition as the first bath. On leaving the cascade, the yarn was either directly subjected to graft copolymerizing or first subjected to a water wash and then to grafting.

In each case, the grafting conditions comprised treating the yarn with a 4 wt. percent aqueous solution of acrylonitrile monomer and 0.8% of a 30% aqueous hydrogen peroxide solution kept at 45° C.; and the fiber to solution ratio was about 1 to 50.

The results are shown in the following table.

TABLE I

| Run No. | Cascade bath temp., ° C. | Fiber treatment before grafting | Percent add-on | Amount of homopolymer |
|---|---|---|---|---|
| 1 | 34 | Full wash | 27 | Very slight. |
| 2 | 90 | No wash | 25 | Much. |
| 3 | 90 | Full wash | 21 | Very slight. |

The foregoing data indicates that where retarding agents are added to the viscose, preventing complete regeneration of the viscose article, substantial cellulose graft copolymer is formed. In addition, washing appears to cut homopolymer formation.

Example II

High tenacity textile fibers were prepared as follows:
A viscose solution was made in the conventional manner having the following composition:

|  | Percent |
|---|---|
| Cellulose | 7.5 |
| Caustic soda | 7.5 |
| Carbon disulfide | [1] 34.0 |

[1] Based on the weight of the cellulose.

The viscose was ripened to a degree shown in Example I and modified by the addition of 1.75% of dimethyl amine and 3.5% of a polyoxyethylene glycol ether of phenol containing an average of 15 ethylene oxide units per mole of phenol, based on the weight of the cellulose.

The viscose was spun and subjected to graft copolymerizing conditions as described in Example I except that the spinning baths each contained 6.2% sulfuric acid, 10.5% sodium sulfate, 3.7% zinc sulfate and 0.75% formaldehyde, and the grafting solution was kept at room temperature. The results are shown in the following table.

TABLE II

| Run No. | Cascade bath temp., ° C. | Fiber treatment before grafting | Percent add-on | Amount of homopolymer |
|---|---|---|---|---|
| 1 | 35 | No wash | 59 | Much. |
| 2 | 47 | do | 55 | Do. |
| 3 | 59 | do | 56 | Do. |
| 4 | 73 | do | 67 | Do. |
| 5 | 95 | do | 78 | Do. |
| 6 | 95 | Washed | 55 | None. |

The above data indicate that even higher amounts of add-on may be obtained when regeneration of the viscose article is still further retarded, in this case by the addition of formaldehyde in the spin baths, so that more xanthate sites are available on the cellulose "backbone" polymer for attachment of the graft polymer.

Washing of the spun article prior to grafting generally increases regeneration but reduces the amount of homopolymer formed by decreasing the amount of impurities present.

Example III

Textile fibers were prepared as follows:

A viscose solution was made in the conventional manner having the following composition:

| | Percent |
|---|---|
| Cellulose | 9.0 |
| Caustic soda | 8.0 |
| Carbon disulfide | [1] 43.0 |

[1] Based on the weight of the cellulose.

The viscose was ripened to a degree shown in Example I and no modifiers were added. It was spun and subjected to graft copolymerizing conditions as shown in Example I except that the spin baths contained 5.8% sulfuric acid, 18% sodium sulfate and 2% zinc sulfate.

The results of the spinning and grafting procedures are given in the following table.

TABLE III

| Run No. | Cascade bath temp., °C. | Fiber treatment before grafting | Percent add-on | Amount of homopolymer |
|---|---|---|---|---|
| 1 | 40 | No wash | None | Some. |
| 2 | 40 | Sluiced [1] | do | None. |
| 3 | 95 | No wash | do | Do. |
| 4 | 95 | Sluiced [1] | do | Do. |

[1] Fiber is run through a water bath on spinning machine.

The above results show that yarn which has been produced in a conventional textile rayon process wherein it has been substantially completely regenerated by passage through coagulating-regenerating baths is not satisfactory for the production of cellulose graft copolymer.

Various changes and modifications may be made practicing the invention without departing from the spirit and scope thereof and, therefore, the invention is not to be limited except as defined in the appended claims.

We claim:

1. A process of producing shaped articles of cellulose graft copolymers which comprises extruding viscose containing a free-radical producing catalyst, in the form of a shaped article into a coagulating medium, and subjecting said article to graft copolymerizing conditions in the presence of at least one polymerizable ethylenically unsaturated monomer prior to complete regeneration of said article.

2. The process of claim 1 wherein the shaped article is a filament.

3. The process of claim 1 wherein the shaped article is a film.

4. The process of claim 1 wherein the free-radical catalyst system contains a peroxide compound.

5. The process of claim 1 wherein the coagulating medium contains a substance capable of retarding the regeneration of the viscose.

6. The process of claim 1 wherein the viscose contains a regeneration retardant substance.

References Cited

UNITED STATES PATENTS

| 2,336,985 | 12/1943 | Freund. |
| 2,686,103 | 8/1954 | Church 260—17 |
| 2,908,659 | 10/1959 | Shashoua 260—17 X |
| 2,914,376 | 11/1959 | Bibolet 264—184 X |
| 3,046,078 | 7/1962 | Salsburg et al. 117—56 X |
| 3,083,118 | 3/1963 | Bridgeford 117—118 X |
| 3,101,276 | 8/1963 | Hendricks 117—145 X |
| 3,128,147 | 4/1964 | Kengon et al. 117—145 X |
| 3,157,527 | 11/1964 | Fournet 117—118 X |
| 3,183,056 | 5/1965 | Pfeiffer 117—118 X |
| 3,310,428 | 3/1967 | Maloney 117—118 |
| 3,359,224 | 12/1967 | Fressinger 260—17 X |
| 3,373,237 | 3/1968 | Mihalik et al. 264—191 X |

JULIUS FROME, *Primary Examiner.*

J. H. WOO, *Assistant Examiner.*

U.S. Cl. X.R.

8—116, 116.2; 106—165; 117—118, 145, 47, 56; 260—17.4, 17; 264—188, 191